United States Patent
Krieger et al.

(10) Patent No.: US 9,154,546 B1
(45) Date of Patent: Oct. 6, 2015

(54) RE-SERVING SHARED CONTENT

(71) Applicants: Ken Krieger, Jackson, WY (US);
Andrew Gildfind, London (GB); Nick Salvatore Arini, Southhampton (GB);
Simon Michael Rowe, Berkshire (GB);
Raimundo Mirisola, Zug (CH)

(72) Inventors: Ken Krieger, Jackson, WY (US);
Andrew Gildfind, London (GB); Nick Salvatore Arini, Southhampton (GB);
Simon Michael Rowe, Berkshire (GB);
Raimundo Mirisola, Zug (CH)

(73) Assignee: Google Inc., Mountain View, CA (US)

( * ) Notice: Subject to any disclaimer, the term of this patent is extended or adjusted under 35 U.S.C. 154(b) by 235 days.

(21) Appl. No.: 13/842,406

(22) Filed: Mar. 15, 2013

(51) Int. Cl.
*H04N 1/387* (2006.01)
*H04L 29/08* (2006.01)

(52) U.S. Cl.
CPC ...................... *H04L 67/10* (2013.01)

(58) Field of Classification Search
USPC ................................... 709/204, 237
See application file for complete search history.

(56) References Cited

U.S. PATENT DOCUMENTS

| | | | |
|---|---|---|---|
| 6,459,500 B1 * | 10/2002 | Takaoka | 358/1.9 |
| 6,850,341 B1 * | 2/2005 | Ito | 358/1.9 |
| 8,321,273 B2 | 11/2012 | Briggs | |
| 2006/0002315 A1 * | 1/2006 | Theurer et al. | 370/261 |
| 2006/0031779 A1 * | 2/2006 | Theurer et al. | 715/781 |
| 2006/0271877 A1 * | 11/2006 | Theurer | 715/781 |
| 2009/0030780 A1 | 1/2009 | York et al. | |
| 2010/0262455 A1 * | 10/2010 | Karlsson et al. | 705/10 |
| 2011/0208599 A1 * | 8/2011 | Sen et al. | 705/16 |
| 2012/0054021 A1 | 3/2012 | Kitts | |
| 2012/0284746 A1 | 11/2012 | Evans | |

FOREIGN PATENT DOCUMENTS

WO  WO-2011130564 A1  10/2011

* cited by examiner

*Primary Examiner* — Jude Jean Gilles
(74) *Attorney, Agent, or Firm* — Foley & Larnder LLP; John D. Lanza

(57) ABSTRACT

A system and method for re-serving shared content are provided. The system includes a first impression detection unit to detect a user's consumption of the shared content via the metering data; a user detection unit to detect a device associated with the user; a shared content retrieval unit to retrieve the shared content based on the user and the device; and a shared content communication unit to transmit the shared content to the detected device.

20 Claims, 4 Drawing Sheets

RE-SERVING SHARED CONTENT

BACKGROUND

A measurement system monitors media consumption habits by a media consumer. Thus, by being cognizant of the media consumption habits, a content provider may effectively determine whether certain content displayed or presented at a specific time is effective at attracting viewership. Media consumption may refer to viewing a program, listening to an audio program, reading a web site, for example.

The measurement system may be implemented at a single source, such as a location near a television. Thus, the measurement system may be equipped with an authentication system that avails a registration for the various personnel associated with the location. The various personnel may register themselves as the media consumer presently associated with the single source.

Alternatively, the measurement system may be equipped with an automatic detection system, thereby automatically logging the presence of a viewer or viewers associated with the content being sourced from the television.

In addition to content being provided by the television, the television and other media sources may provide shared content. The shared content may include information about goods or services. The shared content may include meta information, thereby allowing the media consumer to electively access the meta information to access a web site to learn more about the goods or services associated with the shared content.

In the specific case of shared content sourced from a television, the presentation of the shared content may be static and non-interactive (i.e. no associated meta data). By static, the shared content may be fixed and not based on the viewer being served the shared content.

On the contrary, when shared content is presented via other channels, such as through personalized Internet served content, the shared content selected may be dynamic and determinate based on the user accessing the shared content.

Studies have shown that shared content may be more effective when presented multiple times to a specific user (i.e. re-served). Thus, a user being cognizant of goods or services through shared content may be more inclined to purchase the goods or services based on repeated exposure.

SUMMARY

A system and method for re-serving shared content are provided. The system includes a first impression detection unit to detect a user's consumption of the shared content via the metering data; a user detection unit to detect a device associated with the user a shared content retrieval unit to retrieve the shared content based on the user and the device; and a shared content communication unit to transmit the shared content to the detected device.

DESCRIPTION OF THE DRAWINGS

The detailed description refers to the following drawings, in which like numerals refer to like items, and in which.

DETAILED DESCRIPTION

Due to the static nature of shared content provided through a fixed broadcast medium, such as television, re-serving shared content becomes difficult. Because the shared content is static, the television may not be able re-serve the shared content in a deliberate and directed way.

Conversely, shared content delivered through a broadcast medium such as the Internet may be dynamically selected based on a specific context. Thus, through serving shared content via the Internet, a shared content provider may be able to re-serve shared content.

However, if the first viewing of shared content is accomplished via a viewer watching a television broadcast, this shared content may not be cognizant of a first viewing. Thus, impressions of shared content may not be efficiently used in determining to re-serve shared content.

The systems and methods disclosed herein are directed to re-serving shared content when the shared content is first served via a static source, such as a television broadcast. The systems and methods disclosed herein employ data sourced from a single source panel to maintain a record of a first impression associated with a shared content item. Based on the first impression, the systems and methods disclosed herein may direct a dynamic source of shared content to re-serve the shared content via the user's Internet enabled device.

Thus, by not ignoring impressions associated with a static source, such as a television, a shared content provider may more effectively convey information to a user.

In situations in which the systems discussed here collect personal information about users, or may make use of personal information, the users will be provided with an opportunity to control whether programs or features collect user information (e.g., information about a user's social network, social actions or activities, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user will have control over how information is collected about the user and used by a content server.

Figure 1:
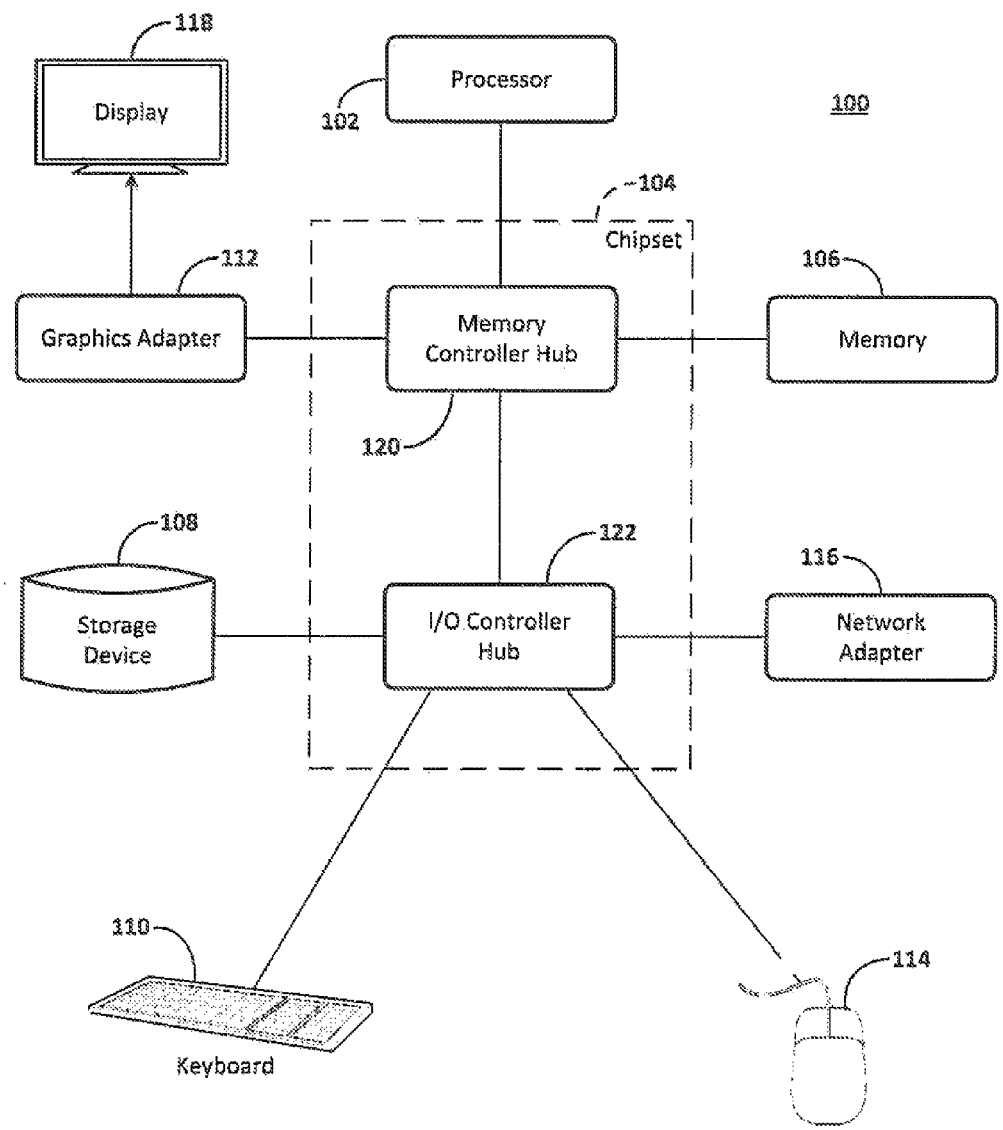
FIG. 1 is a block diagram illustrating an example computer.

FIG. 1 is a block diagram illustrating an example computer 100. The computer 100 includes at least one processor 102 coupled to a chipset 104. The chipset 104 includes a memory controller hub 120 and an input/output (110) controller hub 122. A memory 106 and a graphics adapter 112 are coupled to the memory controller hub 120, and a display 118 is coupled to the graphics adapter 112. A storage device 108, keyboard 110, pointing device 114, and network adapter 116 are coupled to the I/O controller hub 122. Other embodiments of the computer 100 may have different architectures.

The storage device 108 is a non-transitory computer-readable storage medium such as a hard drive, compact disk read-only memory (CD-ROM), DVD, or a solid-state memory device. The memory 106 holds instructions and data used by the processor 102. The pointing device 114 is a mouse, track ball, or other type of pointing device, and is used in combination with the keyboard 110 to input data into the computer system 100. The graphics adapter 112 displays images and other information on the display 118. The network adapter 116 couples the computer system 100 to one or more computer networks.

The computer 100 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 108, loaded into the memory 106, and executed by the processor 102.

The types of computers used by the entities and processes disclosed herein can vary depending upon the embodiment and the processing power required by the entity. For example, a data store, such as a hard disk, solid state memory or storage device, might be stored in a distributed database system comprising multiple blade servers working together to provide the functionality described herein. The computers can lack some of the components described above, such as keyboards 110, graphics adapters 112, and displays 118.

Figure 2:
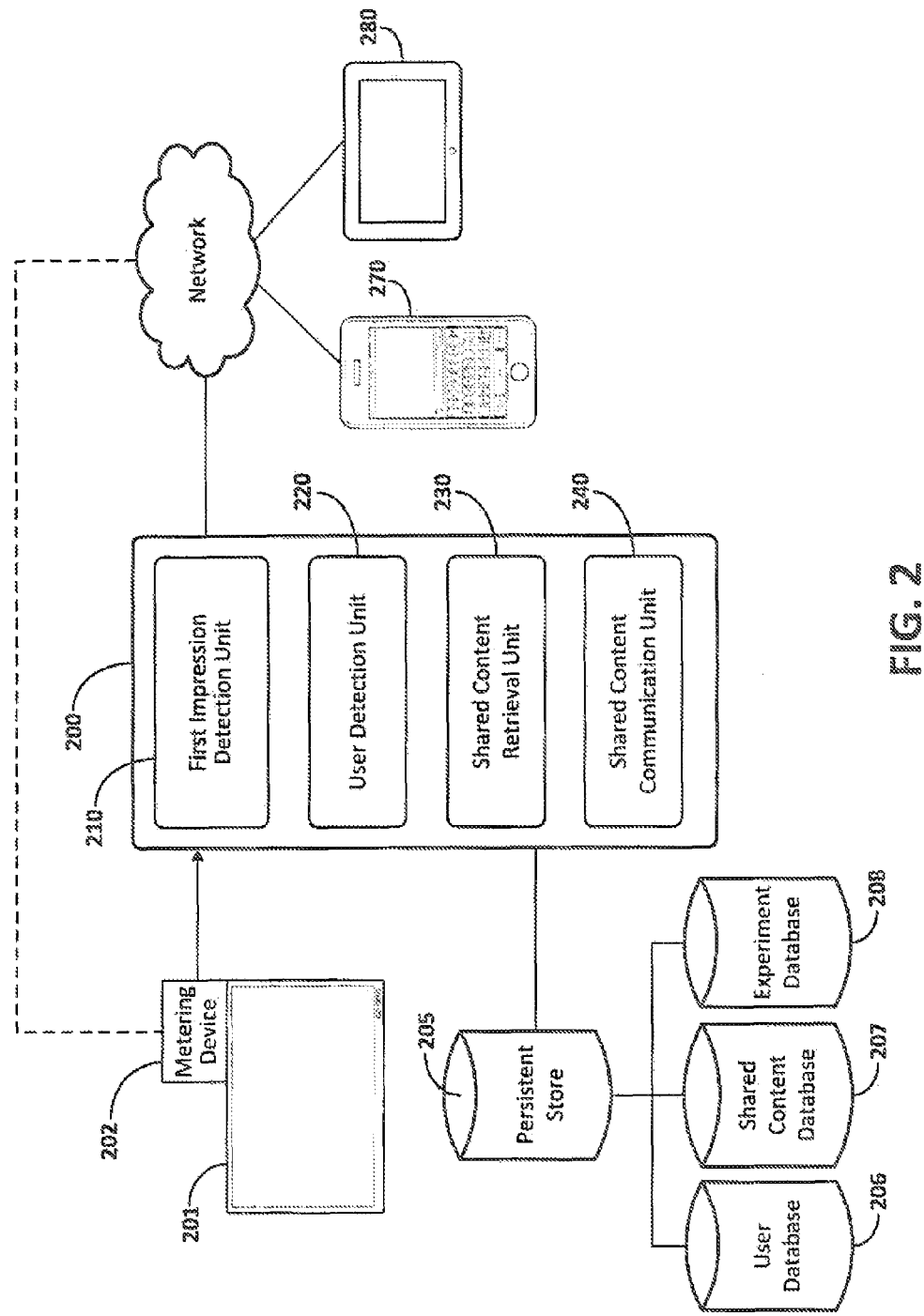
FIG. 2 illustrates an example of a system for re-serving shared content.

FIG. 2 illustrates a system 200 for re-serving shared content. The system 200 includes a first impression detection unit 210, a user detection unit 220, a shared content retrieval unit 230, and a shared content communication unit 240. The system 200 may be implemented on a device, such as computer 100.

The system 200 may communicate with a metering device 202, which is situated as a single source panel associated with television 201. The metering device 202 monitors media consumption associated with television 201 by registered users. The system 200 may communicate via network 260 to a smart phone 270 and a table 280.

The system 200 may communicate with, or incorporate a persistent store 205. The persistent store 205 may be any sort of storage device, such as device 108 described above. The persistent store 205 includes a user database 206, a shared content database 207, and an experimental database 208.

The first impression detection unit 210 detects a first impression associated with a specific user via a metering device 202. The metering device 202 may be situated at, or in communication with, a single source panel. The single source panel may be situated at any sort of media device, such as a television 201.

The first impression detection unit 210 may also detect a first impression over an aggregate of all users associated with the metering device 202. Thus, the first impression detection unit 210 may monitor that all the users associated with the metering device 202, or a predefined threshold number of users, have experienced a first impression.

In another example, the first impression detection unit 210 may detect a first impression over an aggregate number of users who fall within a certain category (such as age, sex, or the like). Thus, if all the users who fall within the certain category, or a number over a predefined threshold fall within the certain category, the first impression detection unit 210 then may register a first impression.

The metering device 202 stores information about the media consumption associated with the specific user while in the presence of television 201. For example, the metering device 202 may detect the content the specific user consumes, as well as the shared content the specific user is privy to.

In addition, the metering device 202 may detect if the specific user views the shared content in its entirety. Further, the metering device 202 may detect if the specific user skipped through the shared content, or changed a channel associated with the shared content. By detecting the above, the metering device 202 may gauge the interest of the shared content by the specific user.

The first impression detection unit 210 may determine if the actions associated with the specific user constitute a first impression. Various techniques and heuristics may be employed to determine if the actions associated with the specific user in regards to the presentation and consumption of shared content constitutes the first impression.

For example, the first impression detection unit 210 may be configured with a predefined number associated with the number of times that a specific user views the shared content. Thus, if the specific user views the share content, for example three times, the first detection unit 210 may register that a first impression has occurred.

Further, the first impression detection unit 210 may consider the gauged interest of the specific user to the shared content being served. For example, the first impression detection unit 210 may only register first impressions based on the specific user viewing the shared content in its entirety.

Additionally, the system 200 may be in communication with the persistent store 205 associated with the specific user. The persistent store 205 may store web browsing or Internet activity associated with the specific user. The first impression detection unit 210 may register a first impression detection unit 210 based on the specific user accessing or searching for content via network 260 related to the shared content.

Several techniques above are presented for detecting a first impression. The techniques presented are not mutually exclusive, and may be combined with each other based on a level of granularity desired by an implementer of system 200.

The user detection unit 220, after receiving notification of a first impression associated with the specific user, accesses the user database 206 and determines if the specific user is stored as a candidate for re-serving of shared content. If the specific user is stored (i.e., the specific user has opted-in to allow themselves to be served shared content), the system 200 retrieves the specific user's associated devices. For example, the user database 206 may correlate the specific user with smart phone 270 and tablet 280.

The shared content retrieval unit 230 retrieves shared content associated with the shared content that triggered the first impression from a shared content database 207. The shared content retrieved may be correlated to the devices retrieved by the user detection unit 220. For example, if the specific user is associated with smart phone 270, the shared content retrieved may be based on this association. Conversely, if the specific user is associated with tablet 280, the shared content retrieved may be based on this association. In this way, shared content ideal for a specific device may be retrieved.

Further, the shared content retrieved may be selectively chosen based on the degree associated with the first impression detected. For example, a deal incorporated into the shared content may be modified based on the number of times the specific user has been exposed to the shared content. In another example, the shared content may be modified based on the specific user's web browsing or Internet activities directed towards the goods or services associated with the shared content.

The shared content communication unit 240 transmits the shared content to the associated device (or devices). The shared content communication unit 240 may determine an appropriate technique and time associated with the transmission. For example, the system 200 may determine that the ideal time to transmit shared content is a specific time after the first impression has been viewed, such as one hour. In another example, the system 200 may determine that the shared content is ideally transferred at a specific time, such as 9 PM, when the specific user may be more willing to purchase the goods or services associated with the shared content.

Additionally, as explained above, the first impression may be detected for all the users associated with the metering device 202, or a group of users. In these cases, the shared content may be transmitted to all the users or the group users based on the aspects disclosed with regards to system 200.

Further, the system 200 may retrieve data from an experimental database 208. The experimental database 208 may record optimal parameters for re-serving shared content. For example, the system may determine that shared content served 2 hours after a first impression is the optimal time for the re-serving. The experimental database 208 may be situated at a centralized server, or incorporated with system 200. The data associated with the experimental database 208 may be further demarcated on a per user and per shared content basis.

Figure 3:
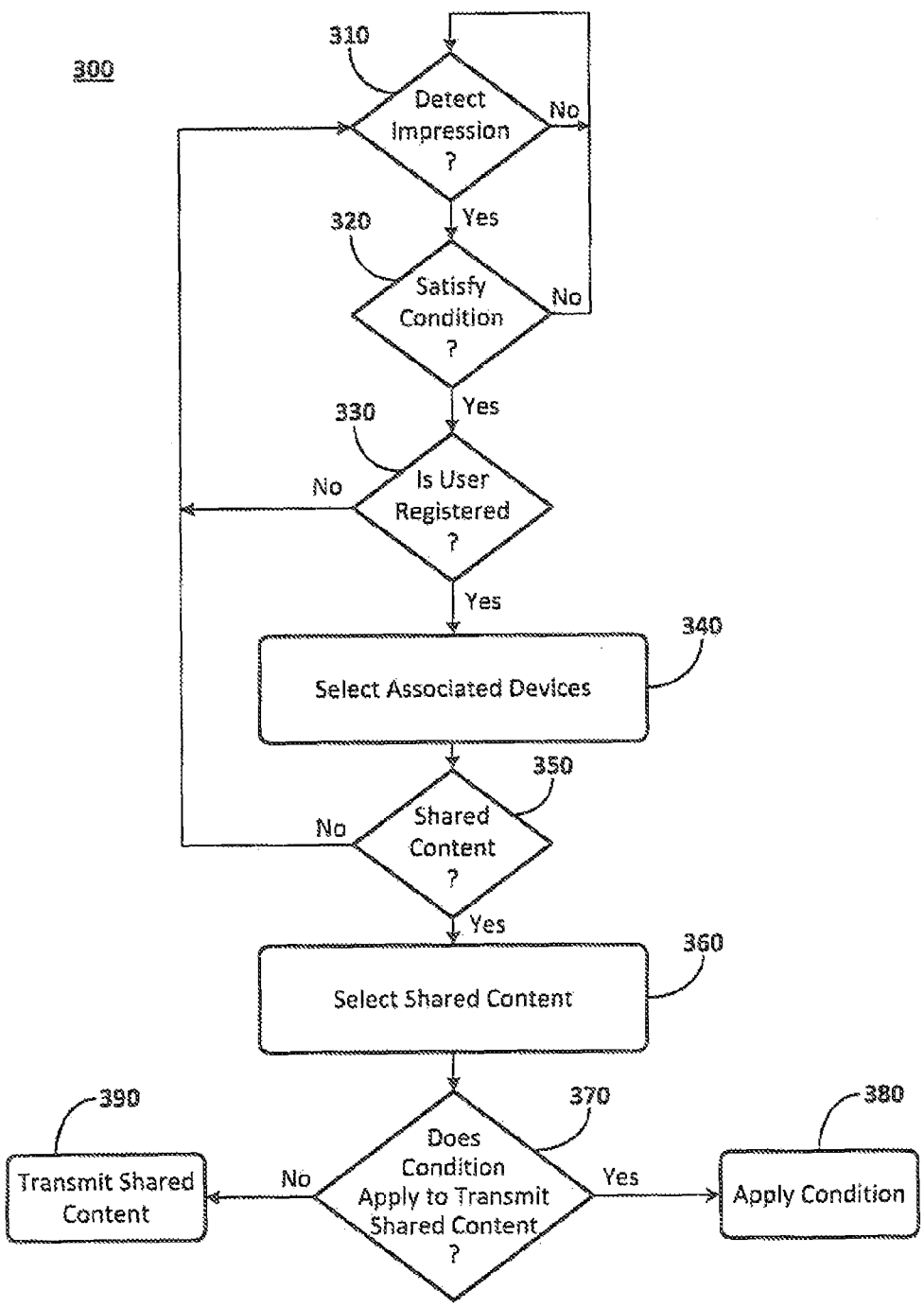
FIG. 3 illustrates an example of a method for re-serving shared content.

FIG. 3 illustrates an example of a method 300 for re-serving shared content. The method 300 may be employed on a device, such as system 200.

In operation 310, the viewing of shared content is detected (first impression). As explained in system 200, the detection may occur at a metering device associated with a single source panel. The detection may occur in conjunction with a static source, such as a television. In operation 320, a determination of whether a condition is satisfied is made. The conditions may be any of the enumerated conditions listed with the first impression detection unit 210. If the conditions are not satisfied, the method 300 remains at operation 310, awaiting a first impression detection.

If the condition is met, the method 300 proceeds to operation 330. In operation 330, a determination is made as to whether the user who experienced the first impression of shared content is registered as a candidate for re-serving of shared content. If no, the method 300 remains at operation 310, awaiting a first impression detection.

If yes, the method proceeds to operation 340. In operation 340, an associated device (or devices) is selected based on the specific user. In operation 350, a determination is made if there is shared content to re-serve based on the shared content that generated the first impression. If no, the method 300 remains at operation 310, awaiting a first impression detection.

If yes, the method 300 proceeds to operation 360. In operation 360, shared content is selected for re-serving based on the same techniques described above in conjunction with the shared content selection unit 230.

In operation 370, a condition for the transmission of the shared content is retrieved. If no condition exists, the shared content is transmitted for re-serving in operation 390.

If a condition does exist, the shared content is re-served based on at least one of the conditions enumerated in conjunction with the shared content 240 retrieval unit 240.

Figure 4:
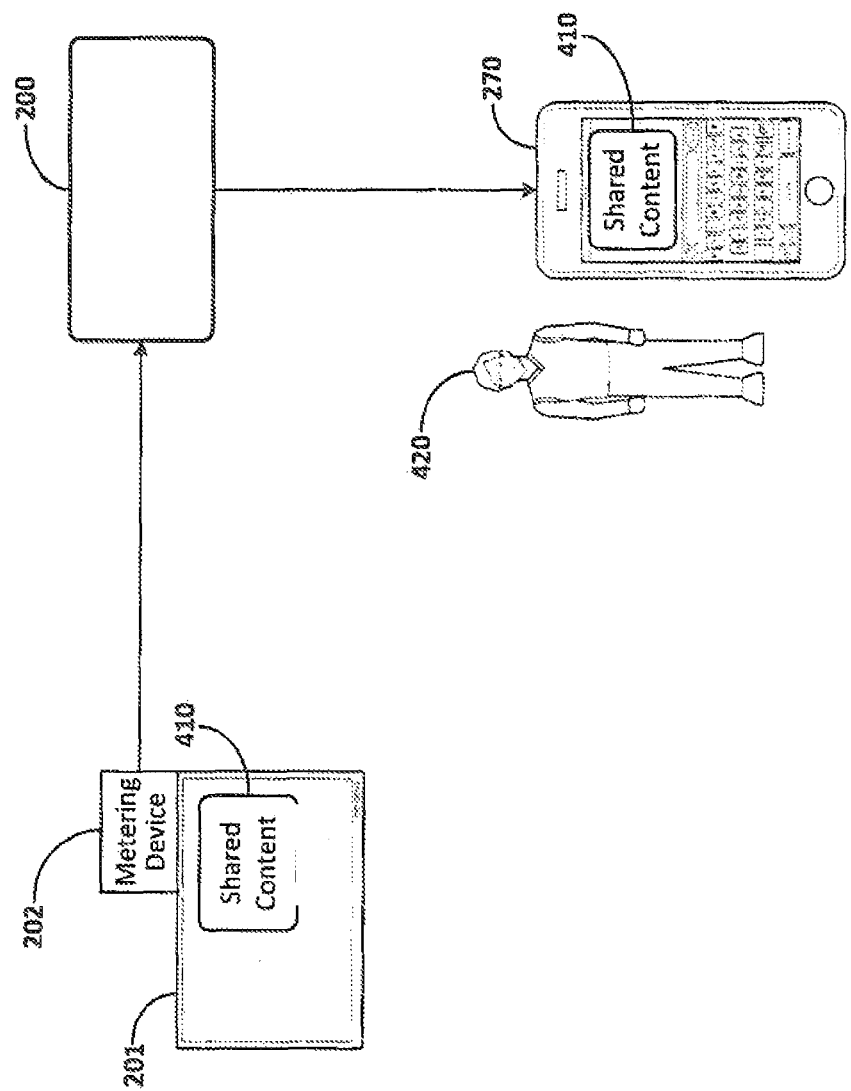
FIG. 4 illustrates an example of an operation of the system shown in FIG. 2.

FIG. 4 illustrates an example operation of system 200. In FIG. 4, shared content 410 is being presented via television 201. The metering device 202 detects a first impression associated by user 420, and notifies the system 200. System 200 selects shared content specifically for user 420 and user 420's smart phone 270, and transmits the shared content 410 for re-serving on the user 420's smart phone 270.

Thus, based on user 420 being exposed to shared content 410 via a static source, such as television 201, the user 420 may be re-served the shared content 410 via the user 420's smart phone 270 based on the aspects disclosed in relation to system 200.

Certain of the devices shown in FIG. 1 include a computing system. The computing system includes a processor (CPU) and a system bus that couples various system components including a system memory such as read only memory (ROM) and random access memory (RAM), to the processor. Other system memory may be available for use as well. The computing system may include more than one processor or a group or cluster of computing system networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAMs) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols.

The preceding disclosure refers to a number of flow charts and accompanying descriptions to illustrate the embodiments represented in FIG. 3. The disclosed devices, components, and systems contemplate using or implementing any suitable technique for performing the steps illustrated in these figures. Thus, FIG. 3 is for illustration purposes only and the described or similar steps may be performed at any appropriate time, including concurrently, individually, or in combination. In addition, many of the steps in these flow charts may take place simultaneously and/or in different orders than as shown and described. Moreover, the disclosed systems may use processes and methods with additional, fewer, and/or different steps.

Embodiments disclosed herein can be implemented in digital electronic circuitry, or in computer software, firmware, or hardware, including the herein disclosed structures and their equivalents. Some embodiments can be implemented as one or more computer programs, i.e., one or more modules of computer program instructions, encoded on a tangible computer storage medium for execution by one or more processors. A computer storage medium can be, or can be included in, a computer-readable storage device, a computer-readable storage substrate, or a random or serial access memory. The computer storage medium can also be, or can be included in, one or more separate tangible components or media such as multiple CDs, disks, or other storage devices. The computer storage medium does not include a transitory signal.

As used herein, the term processor encompasses all kinds of apparatus, devices, and machines for processing data, including by way of example a programmable processor, a computer, a system on a chip, or multiple ones, or combinations, of the foregoing. The processor can include special purpose logic circuitry, e.g., an FPGA (field programmable gate array) or an ASIC (application-specific integrated circuit). The processor also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, module, engine, software, software application, script, or code) can be written in any form of programming language, including compiled or interpreted languages, declarative or procedural languages, and the program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

To provide for interaction with an individual, the herein disclosed embodiments can be implemented using an interactive display, such as a graphical user interface (GUI). Such GUI's may include interactive features such as pop-up or pull-down menus or lists, selection tabs, scannable features, and other features that can receive human inputs.

The computing system disclosed herein can include clients and servers. A client and server are generally remote from each other and typically interact through a communications network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

We claim:

1. A method for re-serving shared content comprising:
   detecting, using a processor of a computing device, output of a first content item by a first media device;
   determining, using the processor, that the detected output meets a condition for an impression;
   selecting, using the processor, a second media device to receive shared content;
   selecting, using the processor, a second content item related to the first content item for re-serving to the second media device, the second content item retrieved from a persistent data store;
   determining, using the processor, that a timing condition for transmitting shared content is met; and
   transmitting, using the processor, the second content item to the second media device.

2. The method of claim 1, wherein detecting the output of the first content item further comprises receiving an identifier of the shared content from the second media device, the shared content identified by matching audio captured using a microphone of the second media device.

3. The method of claim 1, wherein determining that the detected output meets the first condition comprises determining that the first content item has been output at least three times by the first media device.

4. The method of claim 1, wherein determining that the detected output meets the first condition comprises determining that a skip command was not received by the first media device during output of the first content item.

5. The method of claim 1, wherein determining that the detected output meets the first condition comprises determining that the second media device transmitted a request for an online document associated with the shared content, subsequent to the output of the shared content by the first media device.

6. The method of claim 1, wherein determining that the detected output meets the first condition comprises determining that the second media device transmitted a search request related to the shared content subsequent to the impression.

7. The method of claim 1, further comprising:
   formatting the second content item for output by the second media device; and
   modifying the second content item based on detection of a predetermined number of impressions output by the first media device, detection of transmission of a request by the second media device to view an online document associated with the first content item, or detection of transmission of a search request by the second media device.

8. The method of claim 7, wherein the second content item is modified by including a deal selected based on the number impressions detected.

9. The method of claim 1, wherein determining that the timing condition has been met comprises determining that a present time is within a predetermined range after detection of output of the shared content by the first media device.

10. The method of claim 1, wherein determining that the timing condition has been met comprises determining that at least one hour has elapsed since detection of output of the shared content by the first media device, and that the present time is at a particular time of day.

11. A system for re-serving shared content, comprising:
    a first impression detection unit configured to:
        detect output of a first content item by a first media device; and
        determine that the detected output meets a condition for an impression;
    a user detection unit configured to select a second media device to receive shared content;
    a shared content retrieval unit configured to select a second content item related to the first content item for re-serving to the second media device, the second content item retrieved from a persistent data store; and
    a shared content communication unit configured to:
        determine that a timing condition for transmitting shared content is met; and
        transmit the second content item to the second media device.

12. The system of claim 11, wherein the first impression detection unit is further configured to receive an identifier of the shared content from the second media device, the shared content identified by matching audio captured using a microphone of the second media device.

13. The system of claim 11, wherein the first impression detection unit is further configured to determine that the first content item has been output at least three times by the first media device.

14. The system of claim 11, wherein the first impression detection unit is further configured to determine that a skip command was not received by the first media device during output of the first content item.

15. The system of claim 11, wherein the first impression detection unit is further configured to determine that the second media device transmitted a request for an online document associated with the shared content, subsequent to the output of the shared content by the first media device.

16. The system of claim 11, wherein the first impression detection unit is further configured to determine that the second media device transmitted a search request related to the shared content subsequent to the impression.

17. The system of claim 11, wherein the shared content retrieval unit is further configured to:
format the second content item for output by the second media device; and
modify the second content item based on detection of a predetermined number of impressions output by the first media device, detection of transmission of a request by the second media device to view an online document associated with the first content item, or detection of transmission of a search request by the second media device.

18. The system of claim 17, wherein the shared content retrieval unit is further configured to modify the second content item by including a deal selected based on the number impressions detected.

19. The system of claim 11, wherein the shared content communication unit is further figured to determine that at least one hour has elapsed since detection of output of the shared content by the first media device, and that the present time is at a particular time of day.

20. A non-transitory computer-readable medium storing instructions for re-serving shared content, the instructions comprising:
detecting, using a processor of a computing device, output of a first content item by a first media device;
determining, using the processor, that the detected output meets a condition for an impression;
selecting, using the processor, a second media device to receive shared content
selecting, using the processor, a second content item related to the first content item for re-serving to the second media device, the second content item retrieved from a persistent data store;
determining, using the processor, that a timing condition for transmitting shared content is met; and
transmitting, using the processor, the second content item to the second media device.

\* \* \* \* \*